(12) United States Patent
Sun et al.

(10) Patent No.: US 12,003,947 B2
(45) Date of Patent: Jun. 4, 2024

(54) SOUND FIELD OPTIMIZATION METHOD AND DEVICE PERFORMING SAME

(71) Applicant: AAC Microtech (Changzhou) Co., Ltd., Changzhou (CN)

(72) Inventors: Shuyuan Sun, Shenzhen (CN); Yiming Meng, Shenzhen (CN); Hao Yin, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 159 days.

(21) Appl. No.: 17/880,704

(22) Filed: Aug. 4, 2022

(65) Prior Publication Data

US 2023/0209293 A1 Jun. 29, 2023

(30) Foreign Application Priority Data

Dec. 29, 2021 (CN) .......................... 202111637003.2

(51) Int. Cl.
*H04R 5/02* (2006.01)
*H04S 7/00* (2006.01)

(52) U.S. Cl.
CPC .............. *H04S 7/302* (2013.01); *H04R 5/02* (2013.01); *H04R 2430/20* (2013.01); *H04R 2499/13* (2013.01)

(58) Field of Classification Search
CPC ....... H04S 7/302; H04R 5/02; H04R 2430/20; H04R 2499/13
USPC .................................................. 381/302, 303
See application file for complete search history.

(56) References Cited

U.S. PATENT DOCUMENTS

2008/0273714 A1 * 11/2008 Hartung .................. H04R 3/12
381/86

* cited by examiner

*Primary Examiner* — Ammar T Hamid
(74) *Attorney, Agent, or Firm* — W&G Law Group (57) ABSTRACT

The invention provides a sound field optimization method, including steps of building up a first acoustic response model for a controlled area inside a car and building up a second acoustic response model for an uncontrolled area inside the car; building up a first acoustic response difference calculation model based on the first acoustic response model and the second acoustic response model; calculating optimal solution of audio parameters; and controlling each speaker to output audio signals according to corresponding optimal solution of audio parameters. Thus, the vocal area isolation is achieved, so as to provide more extreme acoustic hearing, sound field effect in the controlled area where the user is located inside the car is optimized.

8 Claims, 7 Drawing Sheets

Fig. 1 building up a first acoustic response model based on audio parameters, an acoustic response transfer function and a first acoustic transfer function corresponding to a reference position inside a controlled area to be calculated for each speaker; building up a second acoustic response model based on the audio parameters, the acoustic response transfer function and a second acoustic transfer function corresponding to the reference position inside an uncontrolled area to be calculated — 201 building up a first acoustic response difference calculation model based on the first acoustic response model and the second acoustic response model — 202 calculating optimal solution of audio parameters corresponding to the audio parameters to be calculated for each of the speakers with maximization of acoustic response difference between the controlled area and the uncontrolled area as constraint condition for the first acoustic response difference calculation model — 203 controlling each of the speakers to output audio signals according to the corresponding audio parameters — 204

SOUND FIELD OPTIMIZATION METHOD AND DEVICE PERFORMING SAME

FIELD OF THE PRESENT DISCLOSURE

The invention is related to acoustic technology, particularly a sound field optimization method and a device performing such a method.

DESCRIPTION OF RELATED ART

With the rapid development of intelligent cockpit, as an important part of the intelligent cockpit, audio system can provide indispensable audio and video experience for passengers. Currently, constantly increased users demand poses higher requirements for the features of intelligent cockpit audio system, and a separate vocal area inside a car is the one of those under stronger demand from users.

At present, there are some technological solutions that can achieve certain effect of separate vocal area inside the car, such as directional radiation control of sound by use of a speaker at the seat back, or directional radiation control of sound by use of a speaker at a seat headrest, or inverted sound source counteraction by use of the speaker on the car door. However, these solutions still have problems of imperfect sound field effect, some even can only achieve the separate vocal area division of mono soundtrack in a certain controlled area, thus tending to cause imperfect effect of actual sound experienced at the position of each division.

SUMMARY OF THE PRESENT INVENTION

The invention provides a sound field optimization method at least to solve the problem in the related art of imperfect sound field effect in the separate vocal area inside a car.

Accordingly, the present invention provides a sound field optimization method used in an intelligent cockpit audio system having a first speaker mounted at a back of a front seat and a second speaker mounted on a headrest of a rear sea, the sound field optimization method comprising steps of:
building up a first acoustic response model based on audio parameters, an acoustic response transfer function and a first acoustic transfer function corresponding to a reference position inside a controlled area to be calculated for each speaker, the controlled area being a division of a rear seat currently taken by a rear passenger;
building up a second acoustic response model based on the audio parameters, the acoustic response transfer function and a second acoustic transfer function corresponding to the reference position inside an uncontrolled area to be calculated; the uncontrolled area being a division of a rear seat currently not taken by a rear passenger;
building up a first acoustic response difference calculation model based on the first acoustic response model and the second acoustic response model;
calculating optimal solution of audio parameters corresponding to the audio parameters to be calculated for each of the speakers with maximization of acoustic response difference between the controlled area and the uncontrolled area as constraint condition for the first acoustic response difference calculation model;
controlling each of the speakers to output audio signals according to the corresponding audio parameters.

In addition, the steps of building up the first acoustic response model based on the audio parameters, the acoustic response transfer function and the first acoustic transfer function corresponding to the reference position inside the controlled area, to be calculated for each speaker, comprises step of:
building up the first acoustic response model based on the audio parameters, the acoustic response transfer function and the first acoustic transfer function at ear positions on different sides of the rear passenger inside the controlled area, to be calculated for each speaker.

In addition, before the steps of calculating the optimal solution of the audio parameters corresponding to the audio parameters to be calculated for each of the speakers with the maximization of acoustic response difference between the controlled area and the uncontrolled area as constraint condition for the first acoustic response difference calculation model, further comprises steps of:
building up a third acoustic response model respectively based on the analog audio parameters, the acoustic response transfer function of the virtual speakers arranged oppositely at the ear positions on different sides of the rear passenger and a third acoustic transfer function corresponding to the ear position on corresponding side;
building up a second acoustic response difference calculation model based on the first acoustic response model and the third acoustic response model; and wherein
the steps of calculating the optimal solution of audio parameters corresponding to the audio parameters to be calculated for each of the speakers with the maximization of acoustic response difference between the controlled area and the uncontrolled area as constraint condition for the first acoustic response difference calculation model comprises step of:
calculating optimal solution of the audio parameters to be calculated for each of the speakers jointly with the maximization of acoustic response difference between the controlled area and the uncontrolled area as constraint condition for the first acoustic response difference calculation model and with the minimization of the difference between the actual acoustic response and the analog acoustic response as constraint condition for the second acoustic response difference calculation model.

In addition, the first speaker is a speaker array group having speaker arrays arranged at different positions.

The invention further provides a sound field optimization device used in an intelligent cockpit audio system having a first speaker and a second speaker respectively arranged on a front seat and a rear seat on the same side, the first speaker being arranged at a back of the front seat, the second speaker being arranged at a rear seat headrest, the sound field optimization device comprising:
a first building block, used for building up a first acoustic response model based on audio parameters, an acoustic response transfer function and a first acoustic transfer function corresponding to a reference position inside a controlled area, to be calculated for each speaker, and building up a second acoustic response model based on the audio parameters, the acoustic response transfer function and a second acoustic transfer function corresponding to the reference position inside an uncontrolled area, to be calculated; wherein, the controlled area is a division of rear seats currently taken by the rear passenger, the uncontrolled area is a division of rear seats currently not taken by the rear passenger;

a second building block, used for building up a first acoustic response difference calculation model based on the first acoustic response model and the second acoustic response model;

a calculation module, used for calculating optimal solution of the audio parameters corresponding to the audio parameters to be calculated for each of the speakers with the maximization of acoustic response difference between the controlled area and the uncontrolled area as constraint condition for the first acoustic response difference calculation model;

a control module, used for control each of the speakers to output audio signals according to the corresponding audio parameters.

Further, the first building block is specifically used for building up the first acoustic response model respectively based on the audio parameters, the acoustic response transfer function and the first acoustic transfer function at the ear positions on different sides of the rear passenger inside the controlled area.

Further, the first building block is further used for building up the third acoustic response model respectively based on the analog audio parameters, the acoustic response transfer function of the virtual speakers arranged oppositely at the ear positions on different sides of the rear passenger and the third acoustic transfer function corresponding to the ear position on corresponding side;

the second building block is further used for building up the second acoustic response difference calculation model based on the first acoustic response model and the third acoustic response model;

the calculation module is specifically used for calculating the optimal solution of the audio parameters corresponding to the audio parameters to be calculated for each of the speakers jointly with the maximization of acoustic response difference between the controlled area and the uncontrolled area as constraint condition for the first acoustic response difference calculation model and with the minimization of the difference between the actual acoustic response and the analog acoustic response as constraint condition for the second acoustic response difference calculation model.

Further, the first speaker is a speaker array group having speaker arrays arranged at different positions.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

In order to solve the problem in related art of imperfect sound field effect in separate vocal areas inside a car, the first embodiment of the present invention provides a sound field optimization method which is applied in an intelligent cockpit audio system, the intelligent cockpit audio system comprises a first speaker and a second speaker respectively arranged on a front seat and a rear seat on the same side, the first speaker is arranged at the back of front seat, the second speaker is arranged at a rear seat headrest. In actual applications, the intelligent cockpit audio system comprises but is not limited to a stereophonic sound system, multi-channel system, earphone system, in a preferred embodiment, the speaker of this embodiment adopts a moving-coil, full-range micro car speaker in a size of 30*60*12 mm, alternatively other types or sizes of speaker are also available.

Figure 1:
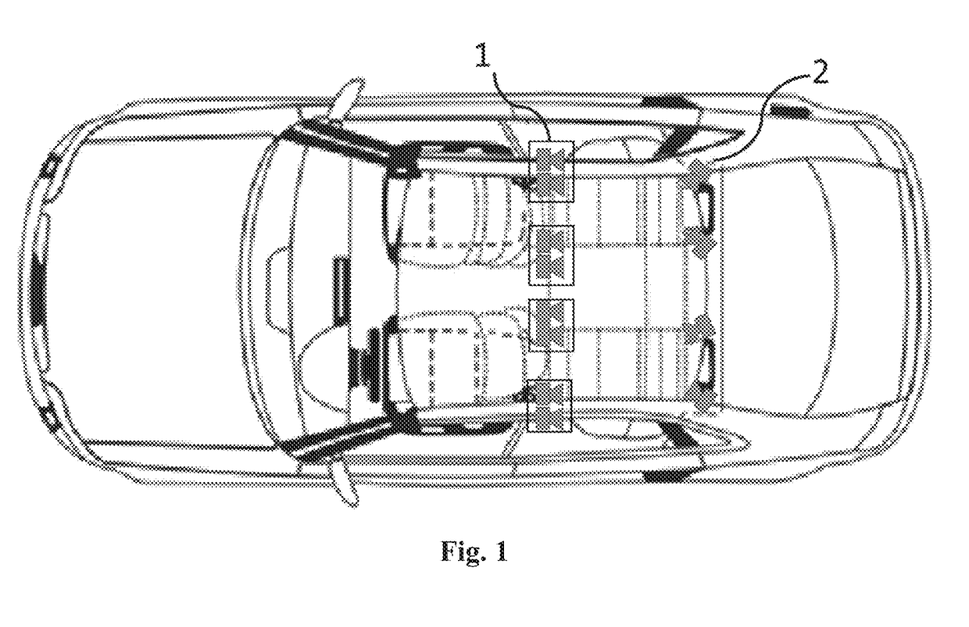
FIG. 1 is a schematic diagram of a layout of an intelligent cockpit audio system of a first embodiment of the invention.

As shown in FIG. 1, it is a schematic diagram of a layout of an intelligent cockpit audio system provided in the embodiment, the first speaker of the embodiment preferably is a speaker array group, the speaker array group comprises several speaker arrays (shown as No. 1 in FIG. 1) arranged at different positions, the second speaker is a headrest speaker group, several headrest speakers can be arranged at the position of the headrest at each rear seat (shown as No. 2 in FIG. 1).

Further, the speaker array of the embodiment may consist of several units or modules, the array types comprise but is not limited to linear array, circular array, etc.

Figure 2:
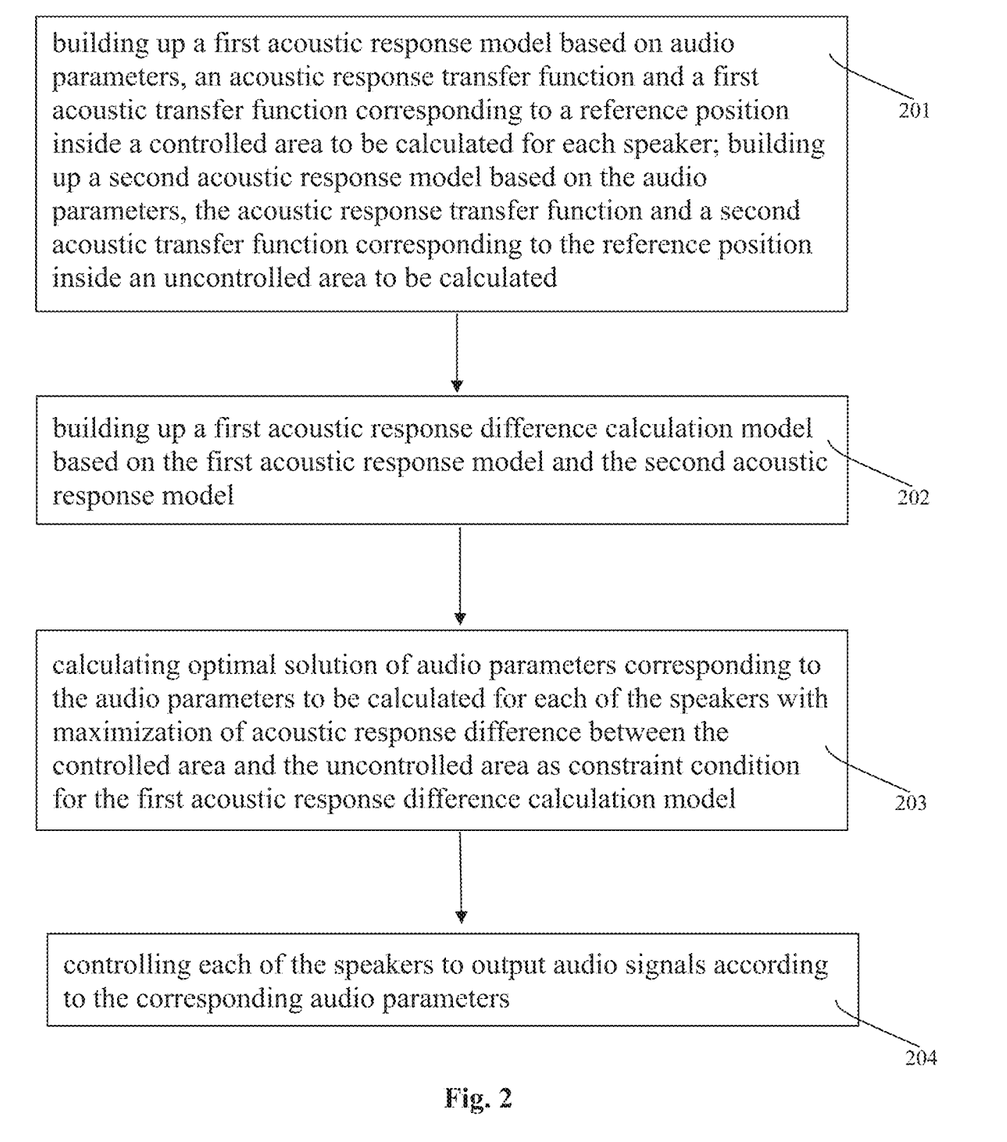
FIG. 2 is a schematic diagram of a basic flow of the intelligent cockpit audio system in the first embodiment of the invention.

As shown in FIG. 2, it is a basic flow chart of the sound field optimization method provided by the embodiment, the sound field optimization method comprises the following steps:

Step 201, build up a first acoustic response model based on audio parameters, an acoustic response transfer function and a first acoustic transfer function corresponding to a reference position inside a controlled area, to be calculated for each speaker, and build up a second acoustic response model based on the audio parameters, the acoustic response transfer function and a second acoustic transfer function corresponding to the reference position inside an uncontrolled area, to be calculated.

Specifically, in actual applications, the rear seat of the car usually can be divided into left and right divisions, the controlled area of the embodiment is a rear seat division now taken by the rear passenger, also can be understood as the hearing vocal area where the object passenger is in, the uncontrolled area is a rear seat division now not taken by the rear passenger, which can be understood as other area where the object passenger isn't in.

It should be noted that the acoustic transfer function of the embodiment refers to the ratio between the Laplace transformation value (or z transformation) of the linear system response (i.e., output) quantity under zero-start condition and the Laplace transformation value of the excitation (i.e., input) quantity, recorded as H=Y/U, wherein Y, U is the Laplace transformation value respectively of output quantity and input quantity. The acoustic transfer function is one of the basic mathematical tools describing dynamic features of linear system, and one of the major tools for studying classical control theories. In the actual applications, the acoustic transfer function of the embodiment can be acquired from direct measurement of actual situation inside the car.

In some implementation methods of the embodiment, the step of building up the first acoustic response model based on the audio parameters, the acoustic response transfer function and the first acoustic transfer function corresponding to the reference position inside the controlled area, to be calculated for each speaker, comprises: Build up the first acoustic response model respectively based on the audio parameters, the acoustic response transfer function and the first acoustic transfer function at ear positions on different sides of the rear passenger inside the controlled area.

Figure 3:
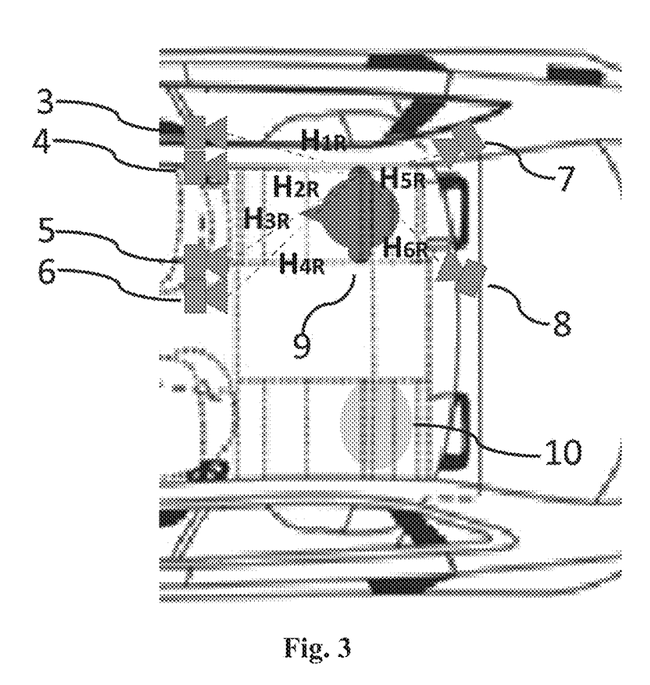
FIG. 3 is a schematic program of an acoustic response of an audio signal transmission into a controlled area inside a car in the first embodiment of the invention.
Figure 4:
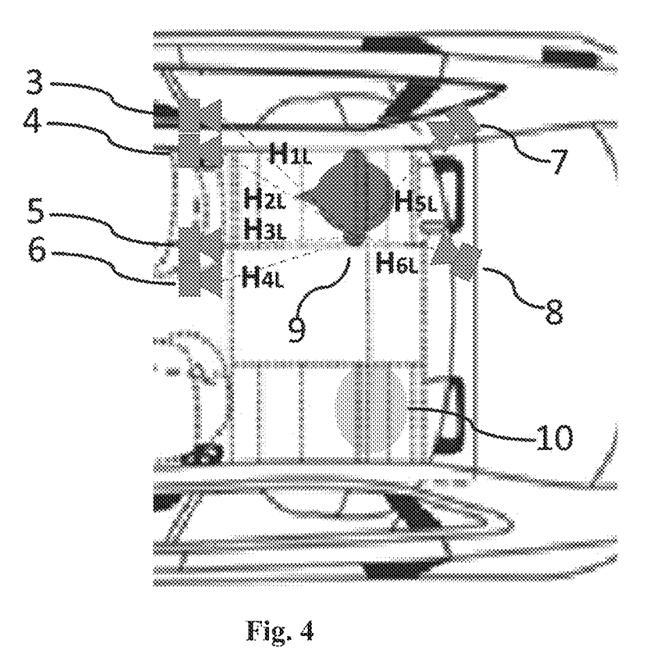
FIG. 4 is a schematic program of an acoustic response of audio signal transmission into the controlled area inside the car in the first embodiment of the invention.

As shown in FIG. 3, it is a schematic program of the acoustic response of audio signal transmission into the controlled area inside the car, as shown in FIG. 4, it is another schematic program of the acoustic response of audio signal transmission into the controlled area inside the car, the speaker array group at the front seat back comprises speaker3, speaker4, speaker5, speaker6, the headrest speaker at a rear seat comprises speaker7, speaker8. For the passenger at a right side of back row, the right side of back row is at a position of controlled area 9, the left side of back row is at a position of uncontrolled area 10. It is mainly illustrated by the example of optimization treatment of the sound field at the position of the right side of back row in the embodiment, while the left side of back row is at a position symmetrical with respect to the right side, subject to the treatment based on same conception, please refer to the following implementation method for details, unnecessary to repeat here in this embodiment.

As shown in FIGS. 3 and 4, $H_{1R}$, $H_{2R}$, $H_{3R}$, $H_{4R}$, $H_{5R}$, $H_{6R}$ respectively denote the acoustic transfer function of speaker3, speaker4, speaker5, speaker6, speaker7, speaker8 with respect to right ear of the rear passenger at the controlled are S1, S2, S3, S4, S5, S6 respectively, through electroacoustic transduction, the final output physical sounds are S1·h$_1$, S2·h$_2$, S3·h$_3$, S4·h$_4$, S5·h$_5$, S6·h$_6$, wherein, h1~h6 denote the acoustic response transfer function of speaker3, speaker4, speaker5, speaker6, speaker7, speaker8. Then the first acoustic response model at the left ear of the rear passenger in controlled area 9 can be denoted as:

$$[S1 \cdot h_1 S2 \cdot h_2 S4 \cdot h_4 S5 \cdot h_5 S6 \cdot h_6]$$
$$[H_{1L} H_{2L} H_{3L} H_{4L} H_{5L} H_{6L}]^T$$

Wherein, $[\ ]^T$ denotes transpose calculation of matrix.

Similarly, the first acoustic response model at the left ear of the rear passenger in controlled area 9 can be denoted as:

$$[S1 \cdot h_1 S2 \cdot h_2 S3 \cdot h_3 S4 \cdot h_4 S5 \cdot h_5 S6 \cdot h_6]$$
$$[H_{1R} H_{2R} H_{3R} H_{4R} H_{5R} H_{6R}]^T$$

Figure 5:
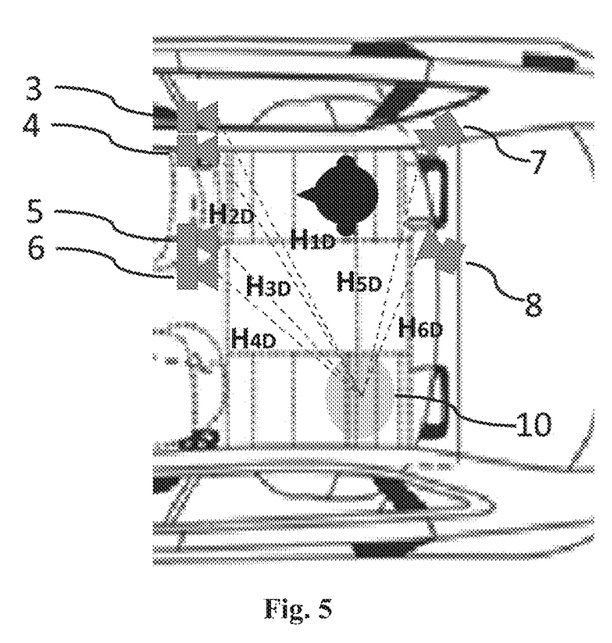
FIG. 5 is a schematic program of an acoustic response of the audio signal transmission into the uncontrolled area inside the car in the first embodiment of the invention.

Furthermore, as shown in FIG. 5, it is a schematic program of the acoustic response of the audio signal transmission into the uncontrolled area inside the car, wherein $H_{1D}$, $H_{2D}$, $H_{3D}$, $H_{4D}$, $H_{5D}$ respectively denote the acoustic transfer function of speaker3, speaker4, speaker5, speaker6, speaker7, speakerS8, with respect to the uncontrolled area 10. The second acoustic response model at the uncontrolled area 10 can be denoted as:

$$[S1 \cdot h_1 S2 \cdot h_2 S3 \cdot h_3 S4 \cdot h_4 S5 \cdot h_5 S6 \cdot h_6]$$
$$[H_{1D} H_{2D} H_{3D} H_{4D} H_{5D} H_{6D}]^T$$

Step 102, build up a first acoustic response difference calculation model based on the first acoustic response model and the second acoustic response model;

Specifically, in order to achieve the sound field effect of the separate vocal area inside the car, it shall satisfy that the audio signal, through space transmission, can maximize the acoustic response difference between the controlled area and the uncontrolled area, the embodiment calculates the acoustic response of the controlled area and the acoustic response of the uncontrolled area before differencing the two, resulting in the calculation model of acoustic response difference.

Step 103, calculate optimal solution of the audio parameters corresponding to the audio parameters to be calculated for each speaker with the maximization of acoustic response difference between the controlled area and the uncontrolled area as constraint condition for the first acoustic response difference calculation model.

Specifically, the embodiment controls the audio parameters S1, S2, S3, S4, S5, S6 of the audio signals output by the speaker3, speaker4, speaker5, speaker6, speaker7, speaker8, speaker9, which shall satisfy the optimal solution of the following conditions respectively:

$$\text{Max} \left\{ \left| \begin{matrix} [S1 \cdot h_1 & S2 \cdot h_2 & S3 \cdot h_3 & S4 \cdot h_4 & S5 \cdot h_5 & S6 \cdot h_6] & [H_{1L} & H_{2L} & H_{3L} & H_{4L} & H_{5L} & H_{6L}]^T \\ -[S1 \cdot h_1 & S2 \cdot h_2 & S3 \cdot h_3 & S4 \cdot h_4 & S5 \cdot h_5 & S6 \cdot h_6] & [H_{1D} & H_{2D} & H_{3D} & H_{4D} & H_{5D} & H_{6D}]^T \end{matrix} \right| \right\}$$

$$\text{Max} \left\{ \left| \begin{matrix} [S1 \cdot h_1 & S2 \cdot h_2 & S3 \cdot h_3 & S4 \cdot h_4 & S5 \cdot h_5 & S6 \cdot h_6] & [H_{1R} & H_{2R} & H_{3R} & H_{4R} & H_{5R} & H_{6R}]^T \\ -[S1 \cdot h_1 & S2 \cdot h_2 & S3 \cdot h_3 & S4 \cdot h_4 & S5 \cdot h_5 & S6 \cdot h_6] & [H_{1D} & H_{2D} & H_{3D} & H_{4D} & H_{5D} & H_{6D}]^T \end{matrix} \right| \right\}$$

trolled area 9, $H_{1L}$, $H_{2L}$, $H_{3L}$, $H_{4L}$, $H_{5L}$, $H_{6L}$ respectively denote the acoustic transfer function of speaker3, speaker4, speaker5, speaker6, speaker7, speaker8 to the right ear of the rear passenger at the controlled area 9. Furthermore, if the audio parameters to be calculated output by the speaker3, speaker4, speaker5, speaker6, speaker7, speaker8 to be Wherein, | | denotes a vector modulus. Through the treatment optimization of this part, it allows the maximization of acoustic response difference between the controlled area 9 and the uncontrolled area 10, achieving relatively idea vocal area isolation.

Further, in some implementation methods of the embodiment, the above steps of calculating the optimal solution of the audio parameters corresponding to the audio parameters to be calculated for each speaker with the maximization of acoustic response difference between the controlled area and the uncontrolled area as constraint condition for the first acoustic response difference calculation model also comprises: build up a third acoustic response model respectively based on the analog audio parameters, the acoustic response transfer function of the virtual speakers arranged oppositely at the ear positions on different sides of the rear passenger;

$$\text{Min}\left\{\left|\begin{matrix}[S1 \cdot h_1 & S2 \cdot h_2 & S3 \cdot h_3 & S4 \cdot h_4 & S5 \cdot h_5 & S6 \cdot h_6] & [H_{1L} & H_{2L} & H_{3L} & H_{4L} & H_{5L} & H_{6L}]^T \\ -S_R \cdot h_R \cdot H_{RR} & & & & & & \end{matrix}\right|\right\}$$

$$\text{Min}\left\{\left|\begin{matrix}[S1 \cdot h_1 & S2 \cdot h_2 & S3 \cdot h_3 & S4 \cdot h_4 & S5 \cdot h_5 & S6 \cdot h_6] & [H_{1R} & H_{2R} & H_{3R} & H_{4R} & H_{5R} & H_{6R}]^T \\ -S_R \cdot h_R \cdot H_{RR} & & & & & & \end{matrix}\right|\right\}$$

build up a second acoustic response difference calculation model based on the first acoustic response model and the third acoustic response model.

Correspondingly, the above step of calculating the optimal solution of the audio parameters corresponding to the audio parameters to be calculated for each speaker with the maximization of acoustic response difference between the controlled area and the uncontrolled area as constraint condition for the first acoustic response difference calculation model comprises: calculating the optimal solution of the audio parameters corresponding to the audio parameters to be calculated for each of the speakers jointly with the maximization of acoustic response difference between the controlled area and the uncontrolled area as constraint condition for the first acoustic response difference calculation model and with the minimization of the difference between the actual acoustic response and the analog acoustic response as constraint condition for the second acoustic response difference calculation model.

Figure 6:
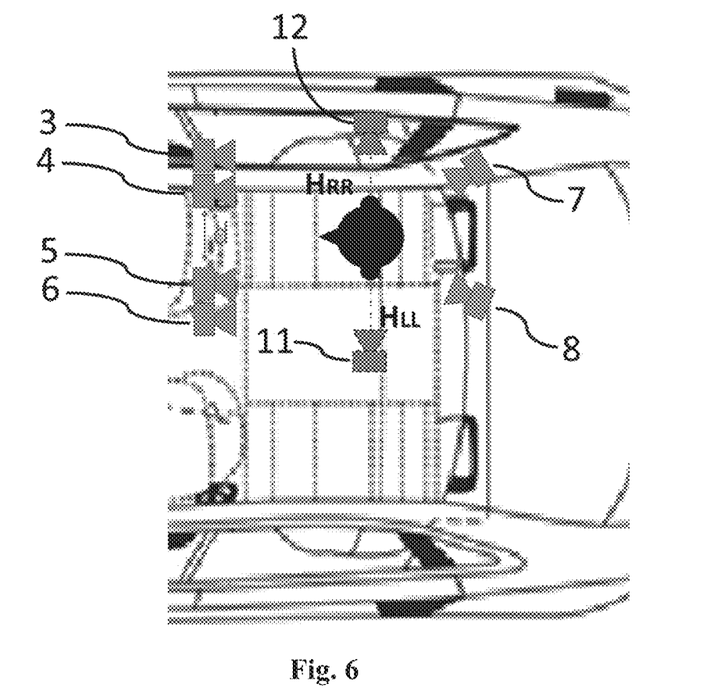
FIG. 6 is a schematic program of an acoustic response of virtual audio signal transmission into the controlled area inside the car in the first embodiment of the invention.

As shown in FIG. 6, it is a schematic program of the acoustic response of virtual audio signal transmission into the controlled area inside the car provided by the embodiment, a left channel virtual speaker11 and a right channel virtual speaker12 are respectively located at the two positions on the left and right sides of the passenger in the controlled area. It shall be noted that, the left channel virtual speaker11 and the right channel virtual speaker12 are only used for the purpose of measuring and determining the target acoustic response, and there is no speaker at the position in actual use, so the target acoustic response at the left ear of the passenger inside the controlled area is:

$$S_L \cdot h_L \cdot H_{LL}$$

Wherein, $S_L$ is the corresponding audio parameters of the analog left channel audio signal, $h_L$ is the acoustic response transfer function of the left channel virtual speaker 11, $H_{LL}$ is the acoustic transfer function from the left channel virtual speaker 11 to the position of the left ear of the passenger inside the controlled area.

Correspondingly, a target acoustic response at the right ear of the rear passenger inside the controlled area is:

$$S_R \cdot h_R \cdot H_{RR}$$

Wherein, $S_R$ is the corresponding audio parameters of the analog left channel audio signal, $h_R$ is the acoustic response transfer function of the left channel virtual speaker 11, $H_{RR}$ is the acoustic transfer function from the left channel virtual speaker 11 to the position of the left ear of the passenger inside the controlled area.

Further, optimization treatment of vocal area sound field is conducted while the preceding isolation optimization of the vocal area is conducted, allowing the audio signal actually transmitted into the ear of the passenger in the controlled area to be kept consistent with or as close as possible to the response produced by the target acoustic system to be simulated inside the controlled area, the audio signal finally output by the speaker shall meet the following conditions at the same time:

Wherein, denotes a vector modulus. By optimization of that part, the actual acoustic hearing produced by the speaker array group and the headrest speaker consisted of speaker3, speaker4, speaker5, speaker6, speaker7, speaker8, at the position of the passenger inside the controlled area can be made close to the acoustic hearing produced by the left channel virtual speaker 11 and the right channel virtual speaker 12 at the position of the passenger inside the controlled area in optimized way, so as to achieve both the effect of separate vocal area division and further optimization of the sound field effect inside the controlled area.

Similarly, same optimization treatment can be done of the speaker array group and the headrest speaker on the left side of the rear seat with reference to the above implementation method, unnecessary to repeat here in this embodiment.

Furthermore, the spacing d in the speaker array group would influence the result of acoustic transfer function, so in actual design, it can be adjusted properly according to actual situation and design objects.

Step 104, control each speaker to output audio signals according to the optimal solution of corresponding audio parameters.

Specifically, after all the speakers outputting audio signals, the sound transmitted into the passenger's ear is the superposition sum at the passenger's ear of the sound sent by the speaker array group and the headrest speaker. By using the speaker array group and the headrest speaker, the embodiment conducts response simulation of the target acoustic system object while maximizing the acoustic response difference between the controlled area and the uncontrolled area, so as to minimize the difference between the actual acoustic response of controlled area and the analog acoustic response, further achieving the optimization of the sound field in the separate vocal area inside the car. It has the advantage of optimizing the sound field effect in the controlled area when satisfying the control of separate vocal area inside the car, thus providing better acoustic experience to the users.

Compared to related art, the sound field optimization method provided by the embodiment builds up the first acoustic response model for the controlled area inside the car and builds up the second acoustic response model for an uncontrolled area inside the car; builds up the first acoustic response difference calculation model based on the first acoustic response model and the second acoustic response model; calculate the optimal solution of audio parameters corresponding to the audio parameters to be calculated for each speaker with the maximization of acoustic response difference between the controlled area and the uncontrolled area as constraint condition of the first acoustic response difference calculation model; control each speaker to output audio signals according to the corresponding optimal solution of audio parameters. The invention is implemented to control different speakers to output audio signals with the maximization of acoustic response difference between the controlled area and the uncontrolled area as constraint condition, achieving relatively ideal vocal area isolation, so as to provide extreme acoustics, optimizing sound field effect in the controlled area where the user is located inside the vehicle.

Figure 7:
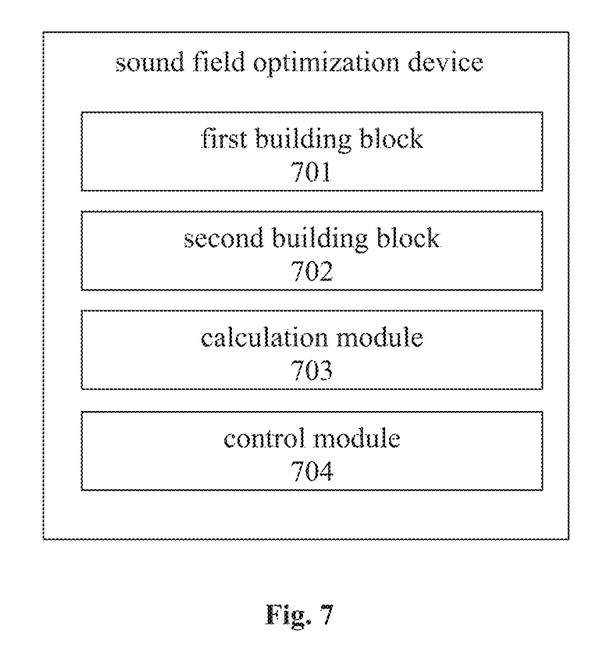
FIG. 7 is a schematic diagram of the programming module of a sound field optimization device in a second embodiment of the invention.

FIG. 7 is a sound field optimization device provided by the second embodiment of the invention. The sound field optimization device is used in an intelligent cockpit audio system, the intelligent cockpit audio system comprises the first speaker and the second speaker respectively arranged on the front seat and rear seat on the same side, the first speaker is arranged at the back of the front seat, the second speaker is arranged at the rear seat headrests. As shown in FIG. 7, the sound field optimization device mainly comprises:

a first building block 701, used for building up the first acoustic response model based on the audio parameters, the acoustic response transfer function and the first acoustic transfer function corresponding to the reference position inside the controlled area, to be calculated for each speaker, and building up the second acoustic response model based on the audio parameters, the acoustic response transfer function and the second acoustic transfer function corresponding to the reference position inside the uncontrolled area, to be calculated; wherein, the controlled area is a division of the rear seats now taken by the rear passenger, the uncontrolled area is a division of the rear seats now not taken by the rear passenger;

a second building block 702, used for building up the first acoustic response difference calculation model based on the first acoustic response model and the second acoustic response model;

a calculation module 703, used for calculating the optimal solution of the audio parameters corresponding to the audio parameters to be calculated for each speaker with the maximization of acoustic response difference between the controlled area and the uncontrolled area as constraint condition for the first acoustic response difference calculation model;

a control module 704, used for controlling each speaker to output audio signals according to the optimal solution of corresponding audio parameters.

In an alternative implementation method of the embodiment, the first building block is specifically used for: building up the first acoustic response model respectively based on the audio parameters, the acoustic response transfer function and the first acoustic transfer function at ear positions on different sides of the rear passenger inside the controlled area.

Further, in an alternative implementation method of the embodiment, the first building block is also used for: building up the third acoustic response model respectively based on the analog audio parameters, the acoustic response transfer function of the virtual speakers arranged oppositely at the ear positions on different sides of the rear passenger and a third acoustic transfer function corresponding to the ear position on corresponding side; the second building block is also used for: building up the second acoustic response difference calculation model based on the first acoustic response model and the third acoustic response model; the calculation module is specifically used for: calculating the optimal solution of the audio parameters corresponding to the audio parameters to be calculated for each speaker jointly with the maximization of acoustic response difference between the controlled area and the uncontrolled area as constraint condition for the first acoustic response difference calculation model and with the minimization of the difference between the actual acoustic response and the analog acoustic response as constraint condition for the second acoustic response difference calculation model.

In an alternative embodiment of the embodiment, the first speaker is a speaker array group, the speaker array group comprises several speaker arrays arranged at different positions.

It should be noted that, all the sound field optimization methods in the first embodiment can be implemented based on the sound field optimization device provided by the embodiment, it's obvious to a person of ordinary skill in the art that, for the convenience and clarification of description, reference can be made to the corresponding process in the embodiment of the preceding methods on the specific working process of the sound field optimization device described in the embodiment, unnecessary to repeat here.

Compared to related art, the sound field optimization device provided by the embodiment builds up the first acoustic response model for the controlled area inside the car and builds up the second acoustic response model for an uncontrolled area inside the car; builds up the first acoustic response difference calculation model based on the first acoustic response model and the second acoustic response model; calculate the optimal solution of audio parameters corresponding to the audio parameters to be calculated for each speaker with the maximization of acoustic response difference between the controlled area and the uncontrolled area as constraint condition of the first acoustic response difference calculation model; control each speaker to output audio signals according to the corresponding optimal solution of audio parameters. The invention is implemented to control different speakers to output audio signal with the maximization of acoustic response difference between the controlled area and the uncontrolled area as constraint condition, achieving relatively ideal vocal area isolation, so as to provide extreme acoustics, optimizing sound field effect in the controlled area where the user is located inside the vehicle.

Figure 8:
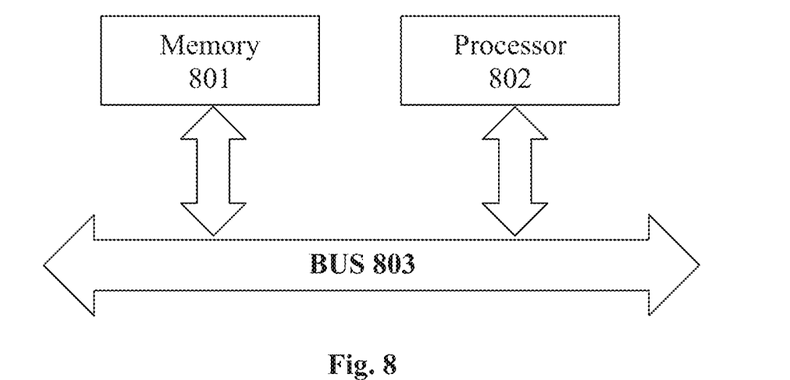
FIG. 8 is a structural diagram of a terminal equipment in a third embodiment of the present invention.

Please refer to FIG. 8. FIG. 8 is a terminal equipment provided by the third embodiment of the invention. The terminal equipment can be used to realize the sound field optimization method in the preceding embodiment. As shown in FIG. 8, the terminal equipment mainly comprises:

a memory 801, a processor 802, a bus 803 and a computer program running on the processor 802, the memory 801 and the processor 802 are connected through the bus 803. The sound field optimization method in the preceding embodiment is implemented when the processor 802 executes the computer program. Wherein, the number of processors can be one or more.

The memory 801 can be either a high-speed random-access memory (RAM), or an involatile memory, such as magnetic disk memory. Memory 801 is used for storing executable programming code, processor 802 is coupled with memory 801.

Further, the embodiment of the invention also provides a computer-readable storage medium, the computer-readable storage medium can be arranged in the terminal equipment in the above embodiments, the computer-readable storage medium can be a memory in the embodiment shown in the preceding FIG. 8.

The computer-readable storage medium has a computer program stored thereon, the sound field optimization method in the preceding embodiment is implemented when the processor executes the computer program. Further, the computer-readable storage medium can be all sorts of mediums available for storing programming codes, such as USB flash disk, mobile hard disk, read-only memory (ROM), RAM, magnetic disk or compact disk.

In several embodiments provided by the invention, it should be understood that the exposed device and method can be implemented in other ways. For example, the embodiments of the device described above are only illustrative, such as the dividing of modules is only a dividing of logic function, there may be other dividing method in actual implementations, such as more modules or components can be combined or integrated into another system, or some features can be ignored or unexecuted. Another point is, the mutual coupling or direct coupling or communication connection shown or discussed can be made through some interfaces, indirect coupling or communication connection among devices or modules, which may be in an electric, mechanic or other form.

The modules described as separate components can be physically separated or not, the components shown as modules can be physical modules or not, i.e., located at one place or distributed onto several network modules. Part or all modules therein can be selected according to actual need to realize the purpose of the solution of the embodiment.

Furthermore, all functional modules in each embodiment of the invention can be integrated in a processing module, or separate physical existence of each module, or integration of two or more modules into one module. The above integrated modules can be implemented in the form of hardware or the form of software functional modules.

The integrated modules can be stored in a computer-readable storage medium if implemented in the form of software functional modules and sold or used as a separate product. Based on such understanding, the technical solution of the invention is substantially or the part contributing to the prior art or all or part of the technical solution can be embodied in the form of software product, the computer software product is stored in a readable storage medium, including a number of instructions for a computer equipment (optionally personal computer, server or network equipment, etc.) to execute all or part of steps of the methods in all embodiments of the invention. The preceding readable storage medium comprises: all sorts of mediums available for storing programming codes, such as USB flash disk, mobile hard disk, ROM, RAM, magnetic disk or compact disk.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sound field optimization method used in an intelligent cockpit audio system having a first speaker mounted at a back of a front seat and a second speaker mounted on a headrest of a rear sea, the sound field optimization method comprising steps of:
building up a first acoustic response model based on audio parameters, an acoustic response transfer function and a first acoustic transfer function corresponding to a reference position inside a controlled area to be calculated for each speaker, the controlled area being a division of a rear seat currently taken by a rear passenger;
building up a second acoustic response model based on the audio parameters, the acoustic response transfer function and a second acoustic transfer function corresponding to the reference position inside an uncontrolled area to be calculated; the uncontrolled area being a division of a rear seat currently not taken by a rear passenger;
building up a first acoustic response difference calculation model based on the first acoustic response model and the second acoustic response model;
calculating optimal solution of audio parameters corresponding to the audio parameters to be calculated for each of the speakers with maximization of acoustic response difference between the controlled area and the uncontrolled area as constraint condition for the first acoustic response difference calculation model;
controlling each of the speakers to output audio signals according to the corresponding audio parameters.

2. The sound field optimization method as described in claim 1, wherein the steps of building up the first acoustic response model based on the audio parameters, the acoustic response transfer function and the first acoustic transfer function corresponding to the reference position inside the controlled area, to be calculated for each speaker, comprises step of:
building up the first acoustic response model based on the audio parameters, the acoustic response transfer function and the first acoustic transfer function at ear positions on different sides of the rear passenger inside the controlled area, to be calculated for each speaker.

3. The sound field optimization method as described in claim 2, wherein before the steps of calculating the optimal solution of the audio parameters corresponding to the audio parameters to be calculated for each of the speakers with the maximization of acoustic response difference between the controlled area and the uncontrolled area as constraint condition for the first acoustic response difference calculation model, further comprises steps of:
building up a third acoustic response model respectively based on the analog audio parameters, the acoustic response transfer function of the virtual speakers arranged oppositely at the ear positions on different sides of the rear passenger and a third acoustic transfer function corresponding to the ear position on corresponding side;
building up a second acoustic response difference calculation model based on the first acoustic response model and the third acoustic response model; and wherein
the steps of calculating the optimal solution of audio parameters corresponding to the audio parameters to be calculated for each of the speakers with the maximization of acoustic response difference between the controlled area and the uncontrolled area as constraint condition for the first acoustic response difference calculation model comprises step of:
calculating optimal solution of the audio parameters to be calculated for each of the speakers jointly with the maximization of acoustic response difference between the controlled area and the uncontrolled area as constraint condition for the first acoustic response difference calculation model and with the minimization of the difference between the actual acoustic response and the analog acoustic response as constraint condition for the second acoustic response difference calculation model.

4. The sound field optimization method as described in claim 1, wherein the first speaker is a speaker array group having speaker arrays arranged at different positions.

5. A sound field optimization device used in an intelligent cockpit audio system having a first speaker and a second speaker respectively arranged on a front seat and a rear seat on the same side, the first speaker being arranged at a back of the front seat, the second speaker being arranged at a rear seat headrest, the sound field optimization device comprising:

a first building block, used for building up a first acoustic response model based on audio parameters, an acoustic response transfer function and a first acoustic transfer function corresponding to a reference position inside a controlled area, to be calculated for each speaker, and building up a second acoustic response model based on the audio parameters, the acoustic response transfer function and a second acoustic transfer function corresponding to the reference position inside an uncontrolled area, to be calculated; wherein, the controlled area is a division of rear seats currently taken by the rear passenger, the uncontrolled area is a division of rear seats currently not taken by the rear passenger;

a second building block, used for building up a first acoustic response difference calculation model based on the first acoustic response model and the second acoustic response model;

a calculation module, used for calculating optimal solution of the audio parameters corresponding to the audio parameters to be calculated for each of the speakers with the maximization of acoustic response difference between the controlled area and the uncontrolled area as constraint condition for the first acoustic response difference calculation model;

a control module, used for control each of the speakers to output audio signals according to the corresponding audio parameters.

6. The sound field optimization device as described in claim 5, wherein the first building block is specifically used for building up the first acoustic response model respectively based on the audio parameters, the acoustic response transfer function and the first acoustic transfer function at the ear positions on different sides of the rear passenger inside the controlled area.

7. The sound field optimization device as described in claim 6, wherein the first building block is further used for building up the third acoustic response model respectively based on the analog audio parameters, the acoustic response transfer function of the virtual speakers arranged oppositely at the ear positions on different sides of the rear passenger and the third acoustic transfer function corresponding to the ear position on corresponding side;

the second building block is further used for building up the second acoustic response difference calculation model based on the first acoustic response model and the third acoustic response model;

the calculation module is specifically used for calculating the optimal solution of the audio parameters corresponding to the audio parameters to be calculated for each of the speakers jointly with the maximization of acoustic response difference between the controlled area and the uncontrolled area as constraint condition for the first acoustic response difference calculation model and with the minimization of the difference between the actual acoustic response and the analog acoustic response as constraint condition for the second acoustic response difference calculation model.

8. The sound field optimization device as described in claim 5, wherein the first speaker is a speaker array group having speaker arrays arranged at different positions.

* * * * *